US006263030B1

(12) United States Patent
Khayrallah

(10) Patent No.: US 6,263,030 B1
(45) Date of Patent: Jul. 17, 2001

(54) EQUALIZER WITH CHANNEL TRACKER SWITCHING

(75) Inventor: Ali S. Khayrallah, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/108,520

(22) Filed: Jul. 1, 1998

(51) Int. Cl.[7] .............................. H03D 1/00; H03B 17/00; H03M 13/03
(52) U.S. Cl. ........................ 375/341; 455/67.1; 714/795
(58) Field of Search .................................. 325/341, 349, 325/346, 262, 229; 455/67.1, 67.3, 441; 714/794, 795

(56) References Cited

U.S. PATENT DOCUMENTS

| 5,230,007 | 7/1993 | Baum | 375/232 |
|---|---|---|---|
| 5,233,633 | 8/1993 | Baum et al. | 375/344 |
| 5,263,053 | 11/1993 | Wan et al. | 375/285 |
| 5,268,930 | 12/1993 | Sendyk et al. | 375/231 |
| 5,422,917 | 6/1995 | Scott | 375/371 |
| 6,064,703 | * 5/2000 | Cusani et al. | 375/349 |
| 6,137,843 | * 10/2000 | Chennakeshu et al. | 375/340 |
| 6,151,487 | * 11/2000 | Kim et al. | 455/134 |

FOREIGN PATENT DOCUMENTS

| 0516133 | 12/1992 | (EP) . |
|---|---|---|
| 0535403 | 4/1993 | (EP) . |
| 0604209 | 6/1994 | (EP) . |
| 96/13910 | 5/1996 | (WO) . |
| 97/44916 | 11/1999 | (WO) . |

* cited by examiner

Primary Examiner—Chi Pham
Assistant Examiner—Khai Tran
(74) Attorney, Agent, or Firm—Wood, Phillips, VanSanten, Clark & Mortimer

(57) ABSTRACT

An equalizer is provided for use in a mobile radio communication system for compensating for changing channel conditions caused by movement of a mobile communication device at varying speeds. The equalizer includes an estimator receiving a digital signal transmitted over a communication channel, the digital signal being adversely modified by fading during transmission caused by movement of the mobile communication device at varying speeds, and a channel estimate signal, the estimator responsively producing a decision signal representing an approximation of the transmitted digital signal with fading eliminated. First and second channel trackers are provided, each tuned to a different speed of the mobile communication device and each receiving the decision signal. A decision circuit receives the decision signal and responsively selects one of the first and second channel trackers to produce the channel estimate signal.

13 Claims, 3 Drawing Sheets

EQUALIZER WITH CHANNEL TRACKER SWITCHING

FIELD OF THE INVENTION

The present invention is directed toward digital data demodulation and, more particularly, toward demodulation of a desired digital signal in a mobile communication device where the channel conditions change with movement of the mobile communication device at varying speeds.

BACKGROUND OF THE INVENTION

Cellular communication systems presently implemented in the U.S. utilize digitized voice and data signals for communication between a mobile communication device, generally a cellular telephone, and a base station. Movement of the mobile communication device at varying speeds (for instance if the user holding the device is walking, running, riding a bike, or in a car or train, etc.) causes channel fading to occur across the communication channels; the change in the signal caused by channel fading varying with time.

Prior art equalizers, which are included in the mobile communication device, generally include an estimator which receives the transmitted digitized signal and produces an output representing a distorted version of the digital signal as actually transmitted. A channel tracker is also included within the equalizer which receives both the transmitted digitized signal and the output of the equalizer, and produces a channel estimate signal representing an approximation of the channel fading that has occurred to the transmitted digitized signal. The role of the channel tracker is to use the output of the estimator to estimate the changes in the signal caused by channel fading, and to produce a channel estimate signal representing an approximation of the changes in the signal due to channel fading. The channel estimate signal produced by the channel tracker is utilized by the estimator to produce a more accurate representation of the digital signal as actually transmitted, i.e., get rid of the changes due to channel fading.

When the mobile communication device is moving at high speeds, the rate of change of the characteristics of a radio channel used by the mobile communication device typically occurs quickly. The opposite is true when the mobile communication device is moving at low speeds. When a channel tracker is built, an assumption must be made about the speed of the mobile communication device in which it is to be utilized. The channel tracker is tuned to the assumed speed and can accurately track the rate of change of the channel's characteristics if the mobile communication device is moving at a speed which approximates the speed to which the channel tracker is tuned. As a result, a channel tracker tuned to a high speed (HS) channel is designed such that it tracks fast changes in the channel's characteristics well. On the other hand, a channel tracker tuned to a low speed (LS) channel is designed such that it tracks slow changes in the channel's characteristics well.

When an HS channel tracker is used in an LS channel, it will tend to track non-existing changes in the channel's characteristics. This can hurt performance by about 1–2 dB. When an LS channel tracker is used in an HS channel, it may not be able to keep up with the changes in the channel's characteristics and can lose the channel completely by the end of a frame. For this reason, an HS tracker is typically chosen and a performance hit is taken at lower speeds.

However, merely placing an HS channel tracker in a wireless communication device or cellular phone is not quite satisfactory. Many people use their cellular phones essentially as wireless phones, that is, at extremely low speeds, e.g., 1–2 kilometers per hour, where the channel is almost static. The same is generally true for personal communicator phones and phones used as wireless modems for portable computers. In such cases, an HS channel tracker is a mismatch.

While there have been successful attempts to actually estimate the speed of the mobile communication device from the received signal, tracking the speed on top of tracking the channel is extremely complex and may result in a computational nightmare. Nevertheless, it is helpful to boost performance by using a channel tracker that is matched to the speed of the mobile communication device.

The present invention is directed toward overcoming one or more of the above-mentioned problems.

SUMMARY OF THE INVENTION

An equalizer is provided for use in a mobile radio communication system for compensating, among other sources of distortion, for changing channel conditions caused by movement of a mobile communication device at varying speeds. The equalizer includes an estimator receiving a digital signal transmitted over a communication channel, the digital signal being adversely modified by fading during transmission caused by movement of the mobile communication device at varying speeds, and a channel estimate signal, the estimator responsively producing a decision signal representing an approximation of the transmitted digital signal with fading eliminated. First and second channel trackers are provided, each tuned to a different speed of the mobile communication device and each receiving the decision signal. A decision circuit receives the decision signal and responsively selects one of the first and second channel trackers to produce the channel estimate signal.

In one aspect of the present invention, the estimator includes a maximum likelihood sequence estimator.

In another aspect of the present invention, the decision circuit responsively selects one of the first and second channel trackers based on the accuracy of the decision signal to the digital signal actually transmitted.

In another aspect of the present invention, the decision circuit includes an error control decoder receiving the decision signal and producing a reliability signal indicative of the accuracy of the decision signal to the digital signal actually transmitted, and a switching circuit receiving the reliability signal and responsively selecting one of the first and second trackers to produce the channel estimate signal.

In another aspect of the present invention, the reliability signal has first and second states. The switching circuit selects said one of the first and second channel trackers to produce the channel estimate signal with the reliability signal in the first state, and the switching circuit selects the other of said one of the first and second channel trackers to produce the channel estimate signal with the reliability signal in the second state.

In another aspect of the present invention, the digital signal is encoded with a Cyclic Redundancy Check (CRC) code prior to transmission. The error control decoder detects CRC errors in the decision signal and produces the second state reliability signal if a CRC error is detected; otherwise the error control decoder produces the first state reliability signal.

In another aspect of the present invention, the estimator produces an estimator metric signal in addition to the decision signal. The error control decoder receives the estimator metric signal and produces the second state reliability signal if the estimator metric signal is above a threshold value; otherwise the error control decoder produces the first state reliability signal.

In another aspect of the present invention, the digital signal is encoded with a block or convolutional code prior to being transmitted. The mobile communication device further includes a decoder decoding the decision signal and producing a decoder metric signal in addition to the decoded decision signal. The error control decoder receives the decoder metric signal and produces the second state reliability signal if the decoder metric signal is above a threshold value; otherwise the error control decoder produces the first state reliability signal.

In another aspect of the present invention, the decoder includes a Viterbi decoder.

In another aspect of the present invention, the digital signal is encoded with a CRC code prior to transmission. The error control decoder detects CRC errors in the decision signal producing a CRC error signal. The estimator produces an estimator metric signal in addition to the decision signal, with the estimator metric signal received by the error control decoder. The error control decoder produces the first or second state reliability signal based on a comparative analysis of the estimator metric and the CRC error signal values.

In another aspect of the present invention, the digital signal is encoded with a CRC code and a block or convolutional code prior to transmission. The error control decoder detects CRC errors in the decision signal producing a CRC error signal. The mobile communication device further includes a decoder decoding the decision signal and producing a decoder metric signal in addition to the decoded decision signal, with the decoder metric signal received by the error control decoder. The error control decoder produces the first or second state reliability signal based on a comparative analysis of the decoder metric and the CRC error signal values.

In still another aspect of the present invention, the digital signal is encoded with a block or convolutional code prior to being transmitted. The mobile communication device further includes a decoder decoding the decision signal and producing a decoder metric signal in addition to the decoded decision signal, with the decoder metric signal received by the error control decoder. The estimator produces an estimator metric signal in addition to the decision signal, with the estimator metric signal received by the error control decoder. The error control decoder produces the first or second state reliability signal based on a comparative analysis of the decoder metric and estimator metric signal values.

In yet another aspect of the present invention, the digital signal is encoded with a CRC code and a block or convolutional code prior to being transmitted. The error control decoder detects CRC errors in the decision signal producing a CRC error signal. The estimator produces an estimator metric signal in addition to the decision signal, with the estimator metric signal received by the error control decoder. The mobile communication device further includes a decoder decoding the decision signal and producing a decoder metric signal in addition to the decoded decision signal, with the decoder metric signal received by the error control decoder. The error control decoder produces the first or second state reliability signal based on a comparative analysis of the estimator metric, decoder metric and CRC error signal values.

In a mobile communication device for use in a mobile radio communication system, a method is provided for compensating for changing channel conditions caused by movement of the mobile communication device at varying speeds. The method includes the steps of receiving, at the mobile communication device, a digital signal transmitted over a communication channel, generating a first channel estimate signal tuned to a first speed of the mobile communication device, generating a second channel estimate signal tuned to a second speed of the mobile communication device, different from the first speed, demodulating the received digital signal using one of the first and second channel estimate signals to track the communication channel, determining the accuracy of the demodulated received digital signal, and selecting one of the first and second channel estimate signals to track the communication channel based on the accuracy of the demodulated received signal.

In one aspect of the present invention, the digital signal is encoded with a CRC code prior to transmission. The steps of determining the accuracy of the demodulated received digital signal and selecting one of the first and second channel estimate signals to track the communication channel based on the accuracy of the demodulated received digital signal includes the steps of detecting CRC errors in the demodulated received digital signal, and selecting the other of the first and second channel estimate signals to track the communication channel if a CRC error is detected.

In another aspect of the present invention, the method further includes the step of generating a demodulator metric signal associated with the demodulated received digital signal. The steps of determining the accuracy of the demodulated received digital signal and selecting one of the first and second channel estimate signals to track the communication channel based on the accuracy of the demodulated received digital signal includes the steps of determining the value of the demodulator metric signal, and selecting the other of the first and second channel estimate signals to track the communication channel if the demodulator metric signal value is above a threshold value.

In another aspect of the present invention, the method further includes the steps of decoding the demodulated received digital signal, and generating a decoder metric signal associated with the decoded received digital signal. The steps of determining the accuracy of the demodulated received digital signal and selecting one of the first and second channel estimate signals to track the communication channel based on the accuracy of the demodulated received digital signal includes the steps of determining the value of the decoder metric signal, and selecting the other of the first and second channel estimate signals if the decoder metric signal value is above a threshold value.

In another aspect of the present invention, the digital signal is encoded with a CRC code prior to transmission. The method further includes the step of generating a demodulator metric signal associated with the demodulated received digital signal. The steps of determining the accuracy of the demodulated received digital signal and selecting one of the first and second channel estimate signals to track the communication channel based on the accuracy of the demodulated received digital signal include the steps of detecting CRC errors in the demodulated received digital signal, determining the value of the demodulator metric signal, and selecting one of the first and second channel estimate signals to track the communication channel based on a comparison of the CRC errors and the demodulator metric signal value.

In another aspect of the present invention, the digital signal is encoded with a CRC code prior to transmission.

The method further includes the steps of decoding the demodulated received digital signal, and generating a decoder metric signal associated with the decoded received digital signal. The steps of determining the accuracy of the demodulated received digital signal and selecting one of the first and second channel estimate signals to track the communication channel based on the accuracy of the demodulated received digital signal include the steps of detecting CRC errors in the demodulated received digital signal, determining the value of the decoder metric signal, and selecting one of the first and second channel estimate signals to track the communication channel based on a comparison of the CRC errors and the decoder metric signal value.

In still another aspect of the present invention, the method further includes the steps of decoding the demodulated received digital signal, generating a decoder metric signal associated with the decoded received digital signal, and generating a demodulator metric signal associated with the demodulated received digital signal. The steps of determining the accuracy of the demodulated received digital signal and selecting one of the first and second channel estimate signals to track the communication channel based on the accuracy of the demodulated received digital signal include the steps of determining the value of the decoder metric signal, determining the value of the demodulator metric signal, and selecting one of the first and second channel estimate signals to track the communication channel based on a comparison of the decoder metric and demodulator metric signal values.

In yet another aspect of the present invention, the digital signal is encoded with a CRC code prior to transmission. The method further includes the steps of decoding the demodulated received digital signal, generating a decoder metric signal associated the decoded received digital signal, and generating a demodulator metric signal associated with the demodulated received digital signal. The steps of determining the accuracy of the demodulated received digital signal and selecting one of the first and second channel estimate signals to track the communication channel based on the accuracy of the demodulated received digital signal include the steps of detecting CRC errors in the demodulated received digital signal, determining the value of the demodulator metric signal, determining the value of the decoder metric signal, and selecting one of the first and second channel estimate signals to track the communication channel based on a comparison of the CRC errors, the demodulator metric signal value and the decoder metric signal value.

It is an object of the present invention to track changing channel conditions in a received digital signal due to movement of a mobile communication device at varying speeds.

It is a further object of the present invention to boost equalizer performance by utilizing a channel tracker matched to the speed of a mobile communication device.

It is a further object of the present invention to switch among a plurality of channel trackers in an equalizer dependent upon demodulation and decoding information.

It is yet a further object of the present invention to accurately demodulate a digitized signal in a mobile radio communication system where the channel conditions change within the duration of a frame.

Other aspects, objects and advantages of the present invention can be obtained from a study of the application, the drawings, and the appended claims.

DETAILED DESCRIPTION OF THE PREFERRED EMBODIMENTS

Figure 1:
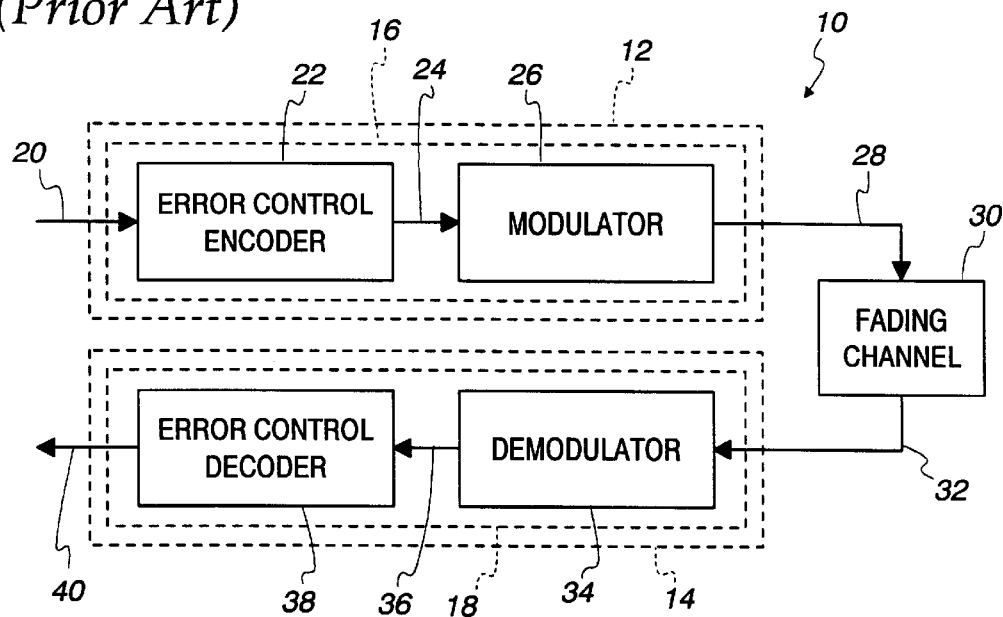
FIG. 1 is a block diagram of the relevant elements of a prior art communication system.

FIG. 1 generally depicts the relevant elements of a prior art mobile communication system, shown generally at 10. The system 10 generally includes a base station 12 communicating with a plurality of mobile communication devices, one of which, 14, is illustrated. For communications from the base station 12 to the mobile communication device 14, the base station 12 includes a transmitter 16 which transmits a signal over the air that is received at a receiver 18 in the mobile communication device 14. It should be understood that while FIG. 1 only illustrates "downlink" communication from the base station 12 to the mobile communication device 14, both the base station 12 and mobile communication device 14 include a transmitter and a receiver for both uplink and downlink communication therebetween.

A digital signal 20 to be transmitted at the base station 12 is first conventionally encoded by an error control encoder 22 at the transmitter 16. The error control encoder 22 may be a CRC (Cyclic Redundancy Check), block or other convolutional encoder. The encoded signal 24 is then conventionally modulated by a modulator 26, and then the digital signal 28 is transmitted across a communications channel where it is subject to channel fading at 30. The digital signal 32 subject to channel fading is received by the receiver 14 and conventionally demodulated by demodulator/equalizer 34. (The terms demodulator and equalizer are used interchangeably herein.) The demodulated signal 36 is then decoded by an error control decoder 38, which basically performs the reverse function of the error control encoder 22, producing a decoded signal 40 for further processing.

Figure 2:
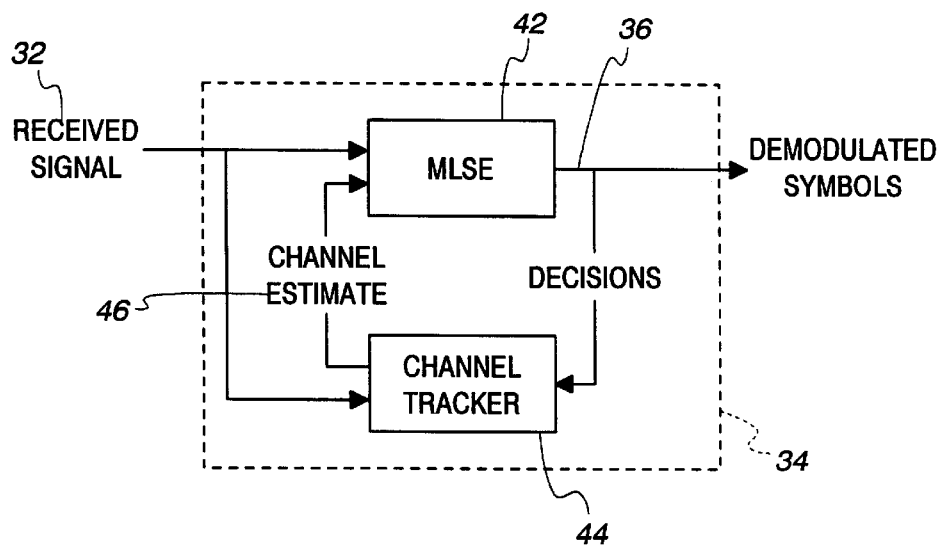
FIG. 2 is a block diagram of the prior art demodulator shown in FIG. 1.

FIG. 2 is a block diagram of the prior art demodulator 34 shown in FIG. 1. The demodulator 34 includes an estimator 42 and a channel tracker 44. The estimator 42 may be a Maximum Likelihood Sequence Estimator ("MLSE") or any other coherent demodulator. The transmitted digital signal 32, subject to channel fading, is received by both the estimator 42 and the channel tracker 44. The estimator 42 conventionally demodulates the received signal 32 and produces a plurality of demodulated symbols 36 representative thereof. The demodulated symbols 36 are input to the channel tracker 44, which analyzes both the received signal 32 and the decisions or demodulated symbols 36 from the estimator 42 and produces a channel estimate signal 46 which is received by the estimator 42. As previously described, the channel estimate signal 46 represents the change in the received signal 32 due to channel fading and is utilized by the estimator 42 in tracking the channel of the received digital signal 32 in order to reduce the effects of any channel fading that may have occurred on the transmitted signal 32. The estimator 42 produces an accurate demodulated signal 36 representation of the digital signal 28 as actually transmitted. However, as previously indicated, the channel tracker 44 is tuned to a certain speed and may either be an HS (high speed) tracker or an LS (low speed) tracker. If the mobile communication device 14 is moving at a speed other than the speed to which the channel tracker 44 is tuned, then the channel tracker 44 cannot accurately track the channel and performance is degraded.

Figure 3:
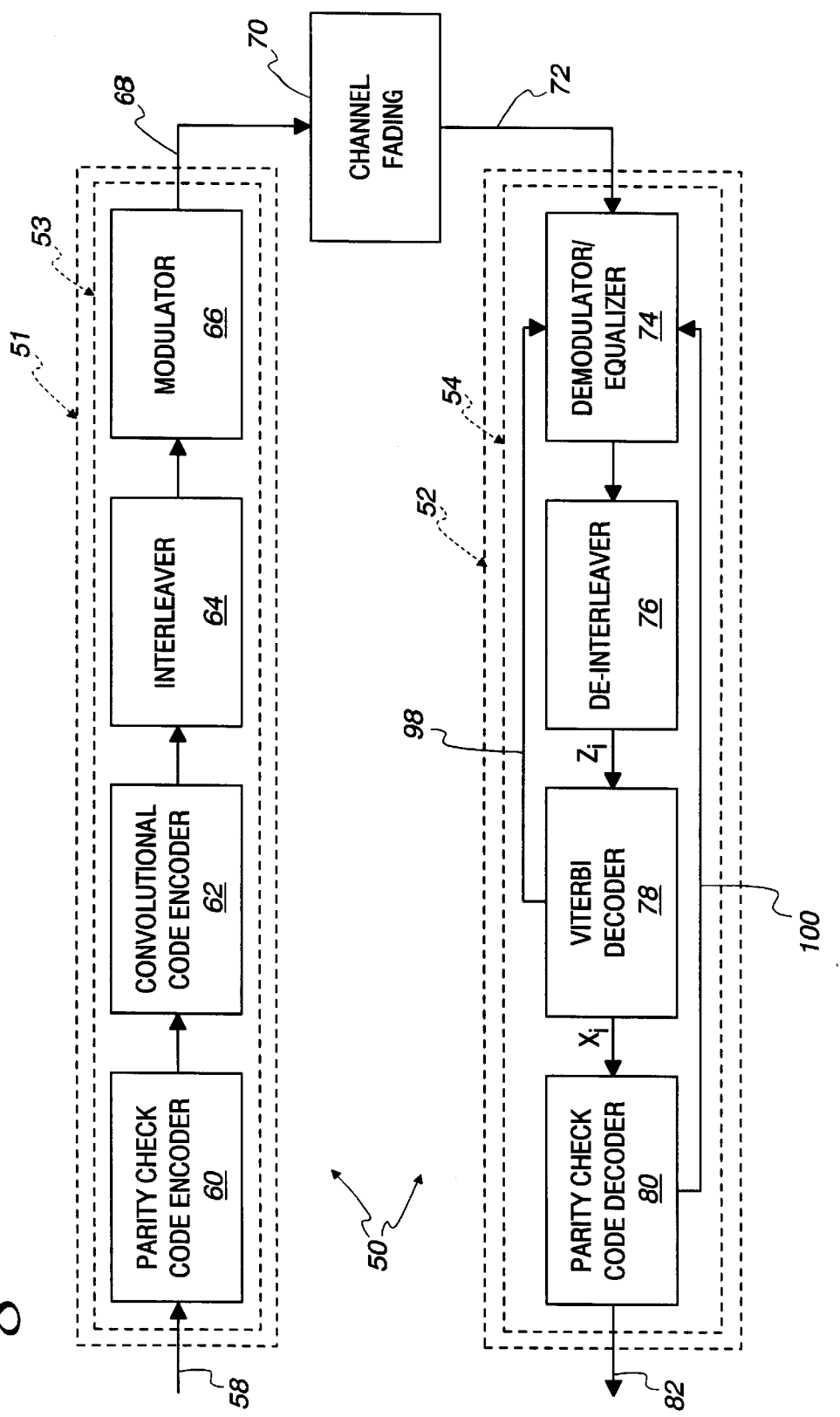
FIG. 3 is a block diagram of a mobile communication system for use with the present invention.

FIG. 3 depicts a communication system, shown generally at 50, for use with the present invention. The communication system 50 includes a base station 51 communicating with a mobile communication device 52, which may include a cellular phone or any other type of wireless communication device. While FIG. 3 depicts downlink communication between the base station 51 and the mobile communication device 52 via a transmitter 53 in the base station 51 and a receiver 54 in the mobile communication device 52, the present invention is also concerned with uplink communication by a transmitter (not shown) in the mobile communication device 52 with a receiver (not shown) in the base station 51. For simplicity only downlink communication will be discussed herein.

Digital information bits 58 to be transmitted are first conventionally encoded with a parity check code by encoder 60; are further conventionally encoded by a convolutional, or block, code by encoder 62; are conventionally interleaved by interleaver 64; and conventionally modulated by modulator 66, thus producing the transmitted digital signal 68. The transmitted digital signal 68 is preferably a TDM (Time Division Multiplexed) signal divided into a plurality of frames.

During transmission across the communication channel, the transmitted digital signal 68 may experience what is commonly known as channel fading at block 70. The digital signal subject to channel fading, indicated at 72, is received at the receiver 54 and the corresponding operations performed by the transmitter 53 are performed in reverse. More specifically, the channel digital signal 72, subject to channel fading, is demodulated by the demodulator/equalizer 74; de-interleaved by de-interleaver 76; decoded by decoder 78, which may be Viterbi decoder; and further decoded with a parity check code decoder 80. The resulting received digital signal 82 may be further processed by the receiver 54 or the mobile communication device 52 for providing the signal in audible form to an end user.

Figure 4:
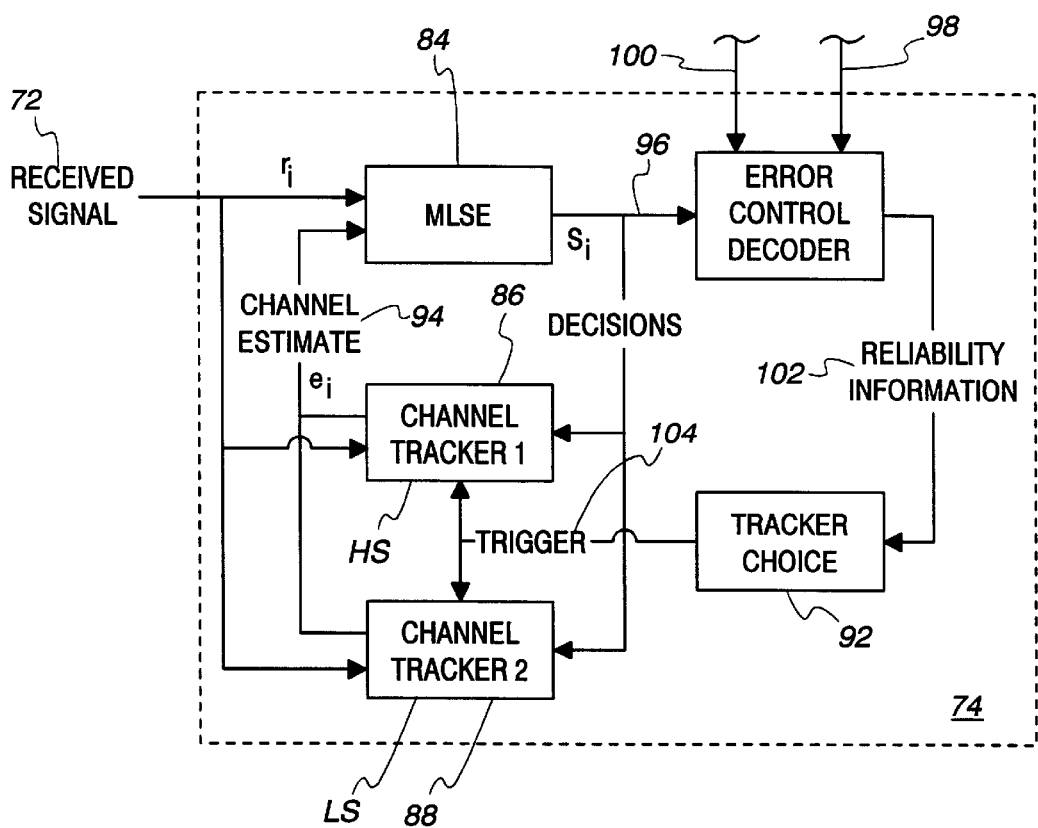
FIG. 4 is a block diagram of the equalizer shown in FIG. 3 and according to the present invention.

FIG. 4 depicts a block diagram of the demodulator/equalizer 74 shown in FIG. 3. The equalizer 74 includes an estimator 84, a first channel tracker 86, a second channel tracker 88, an error control decoder 90 and a tracker choice block 92. The estimator 84, which may be an MLSE or any other coherent demodulator, receives both the received digital signal 72, subject to channel fading, and a channel estimate signal 94, the channel estimate signal being produced by one of the first 86 and second 88 channel trackers, respectively. The estimator 84 demodulates the received signal 72, thus producing a demodulated signal 96. The demodulated signal 96 is received by both the first 86 and second 88 channel trackers, and also by the error control decoder 90. The error control decoder 90 also receives signals 98 and 100 from decoders 78 and 80, respectively, which signals will be explained in detail hereafter.

In operation, the first 86 and second 88 channel trackers are tuned to different speeds. For instance, assume that channel tracker 86 is tuned a high speed, while channel tracker 88 is tuned to a low speed. At the beginning of the call, i.e., prior to receiving signal 72, the receiver 54 chooses one of the two trackers, and for simplicity, it is assumed that the receiver 54 will first choose the HS tracker 86.

The received signal 72 is demodulated by the estimator 84, with the HS channel tracker 86 producing the channel estimate signal 94 which is utilized by the estimator 84 to track the changing channel characteristics during demodulation. The error control decoder 90 receives the demodulated signal 96 and determines whether or not the estimator 84 is accurately demodulating the received signal 72. For instance, if the mobile communication device 52 was static or moving at a very low speed, the HS channel tracker 86 would be a mismatch and would not accurately track the changing channel characteristics. The error control decoder 90 outputs a reliability information signal 102 which is received by the tracker choice block 92. In the above example, the reliability information signal 102 instructs the tracker choice block 92 to activate a trigger 104 and switch to the LS tracker 88. The LS tracker 88 would then produce the channel estimate signal 94, potentially aiding the performance. There are a number of ways which the error control decoder 90 can determine that the estimator 84 is not accurately demodulating the received signal 72. These are discussed below for illustrative purposes only.

One method of switching between channel trackers can be accomplished by looking at the status of the parity check code decoder 80. Typically, the parity check code used at the transmitter 53 is a CRC (Cyclic Redundancy Check) code. The parity check code decoder not only decodes the CRC code but is also capable of determining whether there are errors in the CRC code. This error signal 100 is transmitted to the error control decoder 90. Since the transmitted digital signal 68 is a TDM signal divided into frames, which are further divided into symbols, the parity check is accomplished as follows.

At the beginning of the call, it is assumed that the receiver 54 chooses the HS tracker 86. For frame number i, let $c_i$ denote the parity check flag transmitted by signal 100 ("1" for fail, "0" for pass). For the i-th frame, two cases are considered:

(a) If $c_i=0$, it is assumed that the speech frame is good and the tracker choice is good. This frame may be used in speech reconstruction and the error control decoder 90 instructs the tracker choice block 92, via signal 102, to continue to use the current tracker (HS tracker 86).

(b) If $c_i=1$, it is assumed that the speech frame is bad and the tracker choice is bad. This frame is not used in speech reconstruction and the error control decoder 90 instructs the tracker choice block 92, via signal 102, to switch trackers (switch to the LS tracker 88). If now $c_i=0$, this tracker (the LS tracker 88) is kept for the next frame, etc.

Every time the CRC check fails, the present invention is capable of using the freed-up computational capability to switch trackers and re-demodulate. Then if the CRC check passes, the new tracker can be utilized for the next frame, potentially improving future performance.

Another method of determining whether the estimator 84 is accurately demodulating the received signal 72 is by looking at the final metric of the estimator 84. The received signal 72 includes a plurality of symbols within each frame, these symbols being denoted by $r_i$. Accordingly, the demodulated signal 96 includes a corresponding number of detected symbols denoted as $s_i$. Likewise, the channel estimate signal 94 includes a plurality of channel estimate symbols denoted as $e_i$. In demodulating the received signal 72, the estimator 84 finds the sequence of symbols that minimizes the Euclidian metric $$m = \sum_i |r_i - e_i s_i|^2.$$

When a frame has been demodulated, the outcome is a symbol sequence $s_1, s_2, \ldots s_n$ and its corresponding metric m. The metric m is a measure of the reliability of the frame.

A small metric m indicates a high signal-to-noise ratio, whereas as a large metric m indicates a low signal-to-noise ratio. Accordingly, the error control decoder 90 can be implemented to switch trackers if the estimator metric m is above a threshold value indicating a low signal-to-noise ratio.

Similar to the estimator 84, the decoder 78 also produces a final metric. The decoder 78 receives soft values from the equalizer 74, via de-interleaver 76, which will be denoted as $z_i$, and the decoded or detected information bits output by decoder 78 will be denoted as $x_i$. In producing the soft value $z_i$, the equalizer, instead of just producing a +1 or a −1 for each bit, produces real numbers, e.g., +10 indicates reliable +1, and −0.1 indicates an unreliable −1. The decoder 78, which may be a Viterbi decoder, exploits the soft values $z_i$; it searches the code sequence $y_1, y_2, \ldots y_n$ that minimizes the metric $$m' = \sum_i |z_i - y_i|^2.$$

When the search is finished, the outcome of the decoder 78 is the information bit sequence $x_1, x_2, \ldots x_k$ corresponding to the best code sequence $y_1, y_2, \ldots y_n$. In addition the metric m' is produced. It's interpretation is similar to that of the estimator metric m, namely, a small metric m' indicates a reliable code sequence (a high signal-to-noise ratio), whereas a large metric m' indicates an unreliable code sequence (a low signal-to-noise ratio). The error control decoder 90 can be implemented to switch trackers whenever the decoder metric m' exceeds a threshold value.

Still another method of switching trackers is considered below. Let $M_i$ denote the final estimator metric, and for some L (number of frames), let $$M_i = \frac{1}{L} \sum_{j=0}^{L-1} m_{i-j}$$

and also let $$C_i = \frac{1}{L} \sum_{j=0}^{L-1} c_{i-j}$$

Again, it is assumed that the receiver 54 initially chooses the HS tracker 86 at the beginning of the call. A number of cases are considered:

(1) If $M_i$ and $C_i$ are below a predetermined value, the call is fine and don't switch trackers (keep HS tracker 86).

(2) If $M_i$ is above a predetermined value and $C_i$ is below a predetermined value, the call is okay but switching trackers may help. Switch trackers (switch to LS tracker 88) for the next L frames. If $M_i$ decreases and $C_i$ stays below the predetermined value, keep the new tracker choice (LS tracker 88). Otherwise, switch back to the original tracker (HS tracker 86).

(3) If $c_i=1$, the current frame is bad. Switch trackers (switch to LS tracker 88) and demodulate/decode again. If now $c_i=0$, keep the new tracker choice (LS tracker 88) for the next frame, otherwise keep the current choice (HS tracker 86).

It should be noted that instead of using two trackers tuned to high and low speeds, respectively, there can be a number (T>2) of trackers, each tuned to a different speed in the range. When the error control decoder 90 decides to switch from its current tracker, one of several strategies can be used, for instance:

(1) Cycle through the remaining T-1 trackers, and terminate the search at the first tracker that gives satisfactory performance.

(2) Try the next highest and next lowest trackers (when available) to the current tracker. If neither gives satisfactory performance, try the second next highest and second next lowest trackers (when available), and so on.

It should be noted that various other formulas may be utilized to compute $M_i$ and $C_i$, for instance, an exponential average. The information may also be extracted about the change in $M_i$ and $C_i$ to try and detect the change in the speed of the mobile communication device 52. Finally, the metric m of the estimator 84 may be analyzed not just at the end of the frame, but also throughout the frame. This allows for the detection of the tracking loss phenomenon, which happens when an LS tracker is used in an HS channel. As the tracker begins to lose the channel over the frame, it would be expected that the incremental or branch metric would increase.

One skilled in the art will recognize that other methods, along the lines of those previously described above, may be utilized to determine whether to switch trackers. For instance, a comparative analysis of both the estimator metric and the decoder metric, over a frame or a plurality of frames, may be utilized in determining whether or not to switch trackers. Further, a comparative analysis of both the decoder metric and the CRC error signal values may be utilized to determine whether to switch trackers. Still further, a comparative analysis of the estimator metric, decoder metric and the CRC error signal values may be utilized to determine whether to switch trackers. Each such method would use formulas generally similar to the individual formulas outlined above, as is apparent to one skilled in the art.

While the invention has been described with particular reference to the drawings, it should be understood that various modifications could be made without departing from the spirit and scope of the present invention.

What is claimed is:

1. In a mobile communication device for use in a mobile radio communication system, an equalizer compensating for changing channel conditions caused by movement of the mobile communication device at varying speeds, said equalizer comprising:

an estimator receiving a digital signal transmitted over a communication channel, the digital signal being adversely modified by fading during transmission caused by movement of the mobile communication device at varying speeds, and a channel estimate signal, the estimator responsively producing a decision signal representing an approximation of the transmitted digital signal with fading eliminated;

a first channel tracker tuned to a first speed of the mobile communication device and receiving the decision signal;

a second channel tracker tuned to a second speed of the mobile communication device, different from the first speed, and receiving the decision signal; and a decision circuit receiving the decision signal and responsively selecting one of the first and second channel trackers to produce the channel estimate signal.

2. The equalizer of claim 1, wherein the estimator comprises a maximum likelihood sequence estimator.

3. The equalizer of claim 1, wherein the decision circuit responsively selects one of the first and second channel trackers based on the accuracy of the decision signal to the digital signal actually transmitted.

4. The equalizer of claim 1, wherein the decision circuit comprises:
an error control decoder receiving the decision signal and producing a reliability signal indicative of the accuracy of the decision signal to the digital signal actually transmitted; and
a switching circuit receiving the reliability signal and responsively selecting one of the first and second trackers to produce the channel estimate signal.

5. The equalizer of claim 4, wherein the reliability signal has first and second states, wherein the switching circuit selects said one of the first and second channel trackers to produce the channel estimate signal with the reliability signal in the first state, and wherein the switching circuit selects the other of said one of the first and second channel trackers to produce the channel estimate signal with the reliability signal in the second state.

6. The equalizer of claim 5, wherein the digital signal is encoded with a Cyclic Redundancy Check (CRC) code prior to transmission, and wherein the error control decoder detects CRC errors in the decision signal, the error control decoder producing the second state reliability signal if a CRC error is detected, otherwise the error control decoder produces the first state reliability signal.

7. The equalizer of claim 5, wherein the estimator produces an estimator metric signal in addition to the decision signal, and wherein the error control decoder receives the estimator metric signal and produces the second state reliability signal if the estimator metric signal is above a threshold value, otherwise the error control decoder produces the first state reliability signal.

8. The equalizer of claim 5, wherein the digital signal is encoded with a block or convolutional code prior to being transmitted,
the mobile communication device further includes a decoder decoding the decision signal and producing a decoder metric signal in addition to the decoded decision signal, and
the error control decoder receives the decoder metric signal and produces the second state reliability signal if the decoder metric signal is above a threshold value, otherwise the error control decoder produces the first state reliability signal.

9. The equalizer of claim 5, wherein the decoder comprises a Viterbi decoder.

10. The equalizer of claim 5, wherein the digital signal is encoded with a CRC code prior to transmission,
the error control decoder detects CRC errors in the decision signal producing a CRC error signal,
the estimator produces an estimator metric signal in addition to the decision signal, the estimator metric signal received by the error control decoder, and
the error control decoder producing the first or second state reliability signal based on a comparative analysis of the estimator metric and CRC error signal values.

11. The equalizer of claim 5, wherein the digital signal is encoded with a CRC code and a block or convolutional code prior to being transmitted,
the error control decoder detects CRC errors in the decision signal producing a CRC error signal,
the mobile communication device further includes a decoder decoding the decision signal and producing a decoder metric signal in addition to the decoded decision signal, the decoder metric signal received by the error control decoder, and
the error control decoder producing the first or second state reliability signal based on a comparative analysis of the decoder metric and CRC error signal values.

12. The equalizer of claim 5, wherein the digital signal is encoded with a block or convolutional code prior to being transmitted,
the mobile communication device further includes a decoder decoding the decision signal and producing a decoder metric signal in addition to the decoded decision signal, the decoder metric signal received by the error control decoder,
the estimator produces an estimator metric signal in addition to the decision signal, the estimator metric signal received by the error control decoder, and
the error control decoder producing the first or second state reliability signal based on a comparative analysis of the decoder metric and estimator metric signal values.

13. The equalizer of claim 5, wherein the digital signal is encoded with a CRC code and a block or convolutional code prior to being transmitted,
the error control decoder detects CRC errors in the decision signal producing a CRC error signal,
the estimator produces an estimator metric signal in addition to the decision signal, the estimator metric signal received by the error control decoder,
the mobile communication device further includes a decoder decoding the decision signal and producing a decoder metric signal in addition to the decoded decision signal, the decoder metric signal received by the error control decoder, and
the error control decoder producing the first or second state reliability signal based on a comparative analysis of the estimator metric, decoder metric and CRC error signal values.

* * * * *